United States Patent

Kotani et al.

Patent Number: 5,812,277
Date of Patent: Sep. 22, 1998

[54] FACSIMILE APPARATUS

[75] Inventors: Matahira Kotani, Ikoma-gun; Motohiko Hayashi, Yamatokoriyama, both of Japan

[73] Assignee: Sharp Kabushiki Kaisha, Osaka, Japan

[21] Appl. No.: 308,960

[22] Filed: Sep. 20, 1994

Related U.S. Application Data

[63] Continuation of Ser. No. 68,196, May 28, 1993, abandoned.

[30] Foreign Application Priority Data

May 29, 1992 [JP] Japan .................................. 4-139167

[51] Int. Cl.⁶ ...................................................... H04N 1/00
[52] U.S. Cl. ............................ 358/400; 358/407; 358/444; 379/67
[58] Field of Search .................................. 358/400, 401, 358/403, 435, 439, 402, 405, 436, 438, 442, 443, 407, 444; 379/100, 67, 68, 83, 84; H04N 1/00

[56] References Cited

U.S. PATENT DOCUMENTS

| | | | |
|---|---|---|---|
| 4,766,529 | 8/1988 | Nakano et al. ............... | 364/513.5 |
| 4,893,333 | 1/1990 | Baran et al. ................. | 358/468 |
| 4,922,524 | 5/1990 | Baba et al. .................. | 358/435 |
| 5,001,744 | 3/1991 | Nishino et al. .............. | 358/436 |
| 5,050,005 | 9/1991 | Kagami ....................... | 358/454 |
| 5,056,132 | 10/1991 | Coleman et al. ............. | 375/100 |
| 5,086,455 | 2/1992 | Satomi et al. ............... | 379/100 |
| 5,113,067 | 5/1992 | Nakai et al. ................. | 250/208 |
| 5,136,634 | 8/1992 | Rae et al. .................... | 358/402 |
| 5,163,081 | 11/1992 | Wycherley ................... | 379/52 |
| 5,177,349 | 1/1993 | Setani ......................... | 250/208 |
| 5,187,358 | 2/1993 | Setani ......................... | 250/208 |
| 5,206,900 | 4/1993 | Callele ........................ | 379/142 |
| 5,208,850 | 5/1993 | Kino ............................ | 379/88 |
| 5,221,835 | 6/1993 | Setani ......................... | 250/208 |
| 5,223,703 | 6/1993 | Setani ......................... | 250/208 |
| 5,230,628 | 7/1993 | Kaneko et al. .............. | 434/118 |
| 5,243,437 | 9/1993 | Millman et al. ............. | 358/400 |
| 5,265,153 | 11/1993 | Ozawa ........................ | 358/401 |
| 5,289,532 | 2/1994 | Ishikawa ..................... | 358/439 |
| 5,333,062 | 7/1994 | Hara et al. ................... | 358/437 |
| 5,333,266 | 7/1994 | Boaz et al. .................. | 395/200 |
| 5,337,349 | 8/1994 | Furohashi et al. ........... | 358/400 |
| 5,357,562 | 10/1994 | Metser et al. ............... | 379/67 |
| 5,515,423 | 5/1996 | Beck et al. .................. | 379/100 |

FOREIGN PATENT DOCUMENTS

| | | |
|---|---|---|
| 5887956 | 5/1983 | Japan . |
| 1-318347 | 12/1989 | Japan . |
| 2-81556 | 3/1990 | Japan . |
| 3167954 | 7/1991 | Japan . |

Primary Examiner—Edward L. Coles, Sr.
Assistant Examiner—Madeleine A. V. Nguyen

[57] ABSTRACT

To present a facsimile apparatus capable of preventing occurrence of unsuccessful transmission and enhancing the certainty of information transmission, the manipulating procedure in the manual reception mode for receiving a facsimile signal after an incoming telephone call is provided to the telephone user. When the manual receiving mode is set in the facsimile apparatus, after receipt of the incoming call by lifting the handset of the external telephone set in response to ringing of the calling side terminal device, a CNG signal is transmitted if the calling side is a facsimile apparatus set in an automatic transmitting mode. When this CNG signal is received, the voice signal for instructing the operating procedure for receiving the facsimile signal is delivered to the external telephone set. The operating procedure for receiving the facsimile signal is delivered through the handset, so that the facsimile signal may be easily received by a user not knowledgeable or familiar with the manipulation of the facsimile apparatus.

25 Claims, 5 Drawing Sheets

FACSIMILE APPARATUS

This application is a continuation, of application Ser. No. 08/068,196 filed on May 28, 1993, now abandoned.

BACKGROUND OF THE INVENTION

1. Field of the Invention

The present invention relates to a facsimile apparatus having a telephone set provided internally or externally, and more particularly to a facsimile apparatus of the so-called manual reception type for receiving the facsimile signal in response to a key operation by the operator after a communications connection by the telephone set.

2. Description of the Related Art

The facsimile apparatus is designed to be capable of changing over to an automatic reception mode and a manual reception mode depending on the environments of use. That is, the automatic reception mode is selected when an exclusive network for the facsimile apparatus can be preserved, and the manual reception mode is selected if share one network by the telephone set and the facsimile apparatus.

In the automatic reception mode, from the start until the completion of a reception, no operation by the operator (user) is required at all, but in the manual reception mode, after hearing the telephone ringing bell, the operator lifts the handset to accept, and then presses the start key or the like to start a reception of facsimile signals.

In the facsimile apparatus in which such a manual reception mode is set, when the operator receives a call from the calling side facsimile apparatus in which automatic transmission mode is set, the calling side facsimile apparatus sends out a CNG signal immediately after connection in the receiving side facsimile apparatus. Therefore, the operator of the receiving side facsimile apparatus only hears the CNG signal from the speaker of the handset as an audible sound, and receiving action is not started unless the start key or the like of the facsimile apparatus is pressed. The CNG signal is a signal of frequency 1100Hz±30 Hz transmitted for 35±5 seconds in each cycle of send of 0.5 sec and pause of 3 sec.

Therefore, if the operator does not understand the meaning of the CNG signal or the user is not familiar with the manipulation of the facsimile apparatus, or does not know the intention that the caller has transmitted facsimile signals, the next operation is not started. Accordingly, it is often the case that the connection with the caller is cut off by directly putting on the handset (in on-hook state), and the operator of the calling side must try the sending operation repeatedly, and smooth information transmission is disabled.

SUMMARY OF THE INVENTION

It is hence a primary object of the invention to present a facsimile apparatus capable of preventing occurrence of unsuccessful transmissions and enhancing the certainty of information transmissions, by informing the operator of the manipulating procedure in the manual reception mode for receiving action of facsimile signals after a communication connection by telephone means.

To achieve the above object, the invention presents a facsimile apparatus including:

a facsimile communication unit for transmitting and receiving facsimile signals containing image signals, a telephone unit with a handset incorporating a speaker and microphone, and connected to a public telephone network for transmitting and receiving sound signals, a first changeover circuit interspaced between the public telephone network and the facsimile communication unit for connecting and disconnecting the public telephone network and facsimile communication unit, a detector connected to the public telephone network for detecting a facsimile control signal, an operating unit for instructing start of reception of facsimile signals, a voice signal output unit for producing a voice signal for instructing the operator the operating procedure for receiving the facsimile signals, a second changeover unit interspaced between the public telephone network and the telephone unit for connecting the telephone unit to either the public telephone network or a sound signal output unit, and a controller for starting the reception operation of the facsimile signals in response to operation of the operating unit, in the manual reception mode for receiving the facsimile signals by changing over the first changeover unit after incoming by the telephone unit, by changing over the first changeover unit in response to the output of the detector, after incoming by lifting the handset of the telephone unit, to connect the public telephone network and facsimile communication unit, and changing over the second changeover unit to connect the telephone unit and the sound signal output unit.

The facsimile apparatus of the invention also comprises a display, and the controller displays the operating procedure upon reception of facsimile signal in the display in the manual reception mode, in response to the output of the detector.

In the invention, moreover, the facsimile control signal is a CNG signal.

According to the invention, in the manual reception mode, the public telephone network and the facsimile communication unit are cut off by the first changeover unit, while the public telephone network and telephone unit are connected by the second changeover unit. In this state, when the ringing signal from the exchange is given by the calling action of the calling side terminal device, the ringing bell of the telephone unit is driven, and the ringing bell is produced. Hearing this ringing bell, the operator lifts the handset to accept. After the connection, if the calling side terminal device is, for example, a facsimile apparatus of automatic transmission mode, a facsimile control signal, for example, a CNG signal is sent out. This facsimile control signal, such as a CNG signal, is detected by the detector, the first changeover unit is changed over to connect the public telephone network and the facsimile communication unit, while the second changeover unit is changed over to connect the telephone unit and the voice signal output unit. Consequently, the speaker of the handset delivers the voice signal for instructing the operating procedure upon reception of facsimile signal from the voice signal output unit, and the operator hears this voice signal to recognize the operating procedure, and manipulates the operating unit. In response to the manipulation of the operating unit, the reception action of the facsimile signals by the facsimile communication means is started.

As stated above, in the manual reception mode, when the ringing signal from the exchange is given by the calling action of the calling side terminal device, the ringing bell of the telephone unit is driven, and the ringing bell is produced, hearing this ringing bell, the operator lifts the handset to accept. After the connection, when the facsimile control signal(for example, a CNG signal) is sent out, the speaker of the handset delivers the voice signal for instructing the operating procedure upon reception of facsimile signal, and the operator hears this voice signal to recognize the operating procedure, and manipulates the operating unit. In response to the manipulation of the operating unit, the reception action of the facsimile signals by the facsimile communication unit is started.

Therefore, the operator understands the request of transmission of facsimile signals by the calling side terminal device by the voice signal, and can immediately manipulate for reception. As a result, preventing occurrence of unsuccessful communication in the manual reception mode, the certainty of information transmission is enhanced. Incidentally, the display of the facsimile apparatus may be also designed to display the operating procedure upon reception of facsimile signals.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other and further objects, features, and advantages of the invention will be more explicit from the following detailed description taken with reference to the drawings, which are given by way of illustration only and thus are not limitative of the present invention, and wherein:

FIG. 3 (A)–(C) are a flow chart for explaining the operation in manual reception mode of the facsimile apparatus 1.

FIG. 4 (A)–(H) are timing charts showing the operation in the manual reception mode in the facsimile apparatus 1.

DETAILED DESCRIPTION OF THE PREFERRED EMBODIMENT

Now referring to the drawing, preferred embodiments of the invention are described below.

Figure 1:
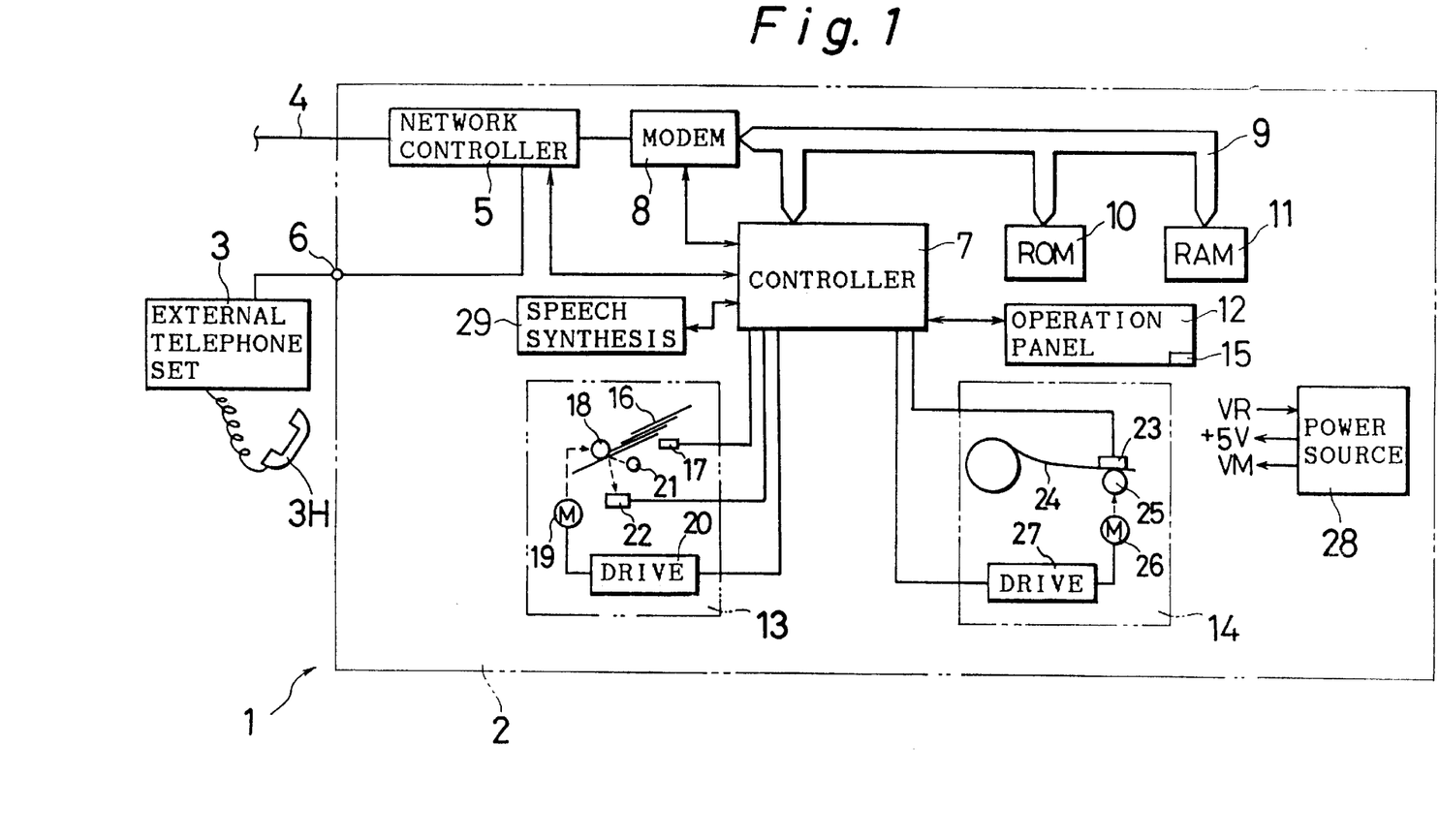
FIG. 1 is a block diagram showing a schematic construction of a facsimile apparatus 1 as an embodiment of the invention.

FIG. 1 is a block diagram showing a schematic construction of a facsimile apparatus 1 as an embodiment of the invention. The facsimile apparatus 1 comprises a main body 2 for executing the facsimile communication function, and an external telephone set 3 connected to the main body 2. The external telephone set 3 is a general telephone set, and may be a pushbutton type or a dial type for example. The external telephone set 3 comprises a handset 3H which incorporates a speaker and a microphone.

A public telephone network 4 is connected to a network control circuit 5. The network control circuit 5 comprises a terminal 6 to which the external telephone set 3 is connected, and controls the connection and disconnection of the public telephone network 4, depending on the control signal from a controller 7, that is, controls the connection and disconnection of the public telephone network 4, external telephone set 3, and a modem 8 described later.

The controller 7 comprises CPU (central processing unit) and ASIC (application specific integrated circuit), and the CPU executes the entire control of the main body 2, while the ASIC is responsible for various input and output processing, reading signal processing from a reader 13 mentioned later, compounding and coding of video signal to be transmitted or video signal received, control of a recorder 14 mentioned later, control of motors of the reader 13 and recorder 14, control of the network control circuit 5, control of speech synthesizing circuit 29, etc.

The modem 8 demodulates the facsimile signal received through the public telephone network 4 and network control circuit 5, and modulates the facsimile signal containing the image data to be transmitted given from the controller 7.

The controller 7, the modem 8, ROM (read only memory) 10, and RAM (random access memory) 11 are mutually connected through a data bus 9. In the ROM 10, various operation programs of the main body 2 of the facsimile apparatus 1, for example, programs for controlling the receiving action and transmitting action are stored, and the controller 7 reads out and executes these operation programs appropriately. In the RAM 11, the work area for execution of such operation programs is set, together with the image data storage area for storing the image data.

This image data storage area is used, when receiving, for representative receiving, for example, if recording is disabled due to error of the recorder 14 described below, or for receiving in a special reception mode, such as transmission addressed to a specific individual from the calling side. When transmitting, on the other hand, it is used for the timer transmission for temporarily storing the image data given from the reader 13 and transmitting the stored data at the preset time, or for transmission of same original sequentially to plural receiving side facsimile apparatuses.

In the controller 7, an operation panel 12, reader 13, recorder 14, and speech synthesizing circuit 29 are connected. The operation panel 12 comprises plural keys for setting and instructing the operation of the main body 2, such as start button 15 for instructing to start an action.

The reader 13, when feeding of the original document 16 is detected by a document sensor 17, drives a conveying roller 18, and conveys the document 16 sequentially to the reading position. The conveying roller 18 is driven and rotated by a motor 19, and this motor 19 is driven by a drive circuit 20 according to a drive signal from the controller 7.

At the reading position, the light from a light source 21 is emitted on the document plane, and the reflected light enters a reading device 22. The reading device 22 is realized by a photoelectric transducing element, for example, CCD (charge coupled device). The electric signal converted by the reading device 22 is given to the controller 7, and is applied to the modem 8 or RAM 11 after being coded by the ASIC.

The recorder 14 prints the image signal given from the controller 7 on a recording paper 7 such as thermal recording paper by using a printing head 23 realized by a thermal head or the like. The recording paper 24 is held and conveyed by the printing head 23 and conveying roller 25. The conveying roller 25 is rotated and driven by a motor 26, and this motor 26 is controlled by a control circuit 27 according to the drive control signal given from the controller 7.

The speech synthesizing circuit 29 delivers a predetermined voice signal in response to the instruction from the controller 7.

A power source circuit 28 is also provided in the main body 2. The power source circuit 28 converts the AC power from a commercial AC (alternating current) power source into voltage and current required in the main body 2, and supplies to the circuits and devices mentioned above. In this embodiment, the power source circuit 28 produces +5 V and voltage VM as the voltages to be applied to the network control circuit 5, and receives the voltage VR from the network control circuit 5.

Figure 2:
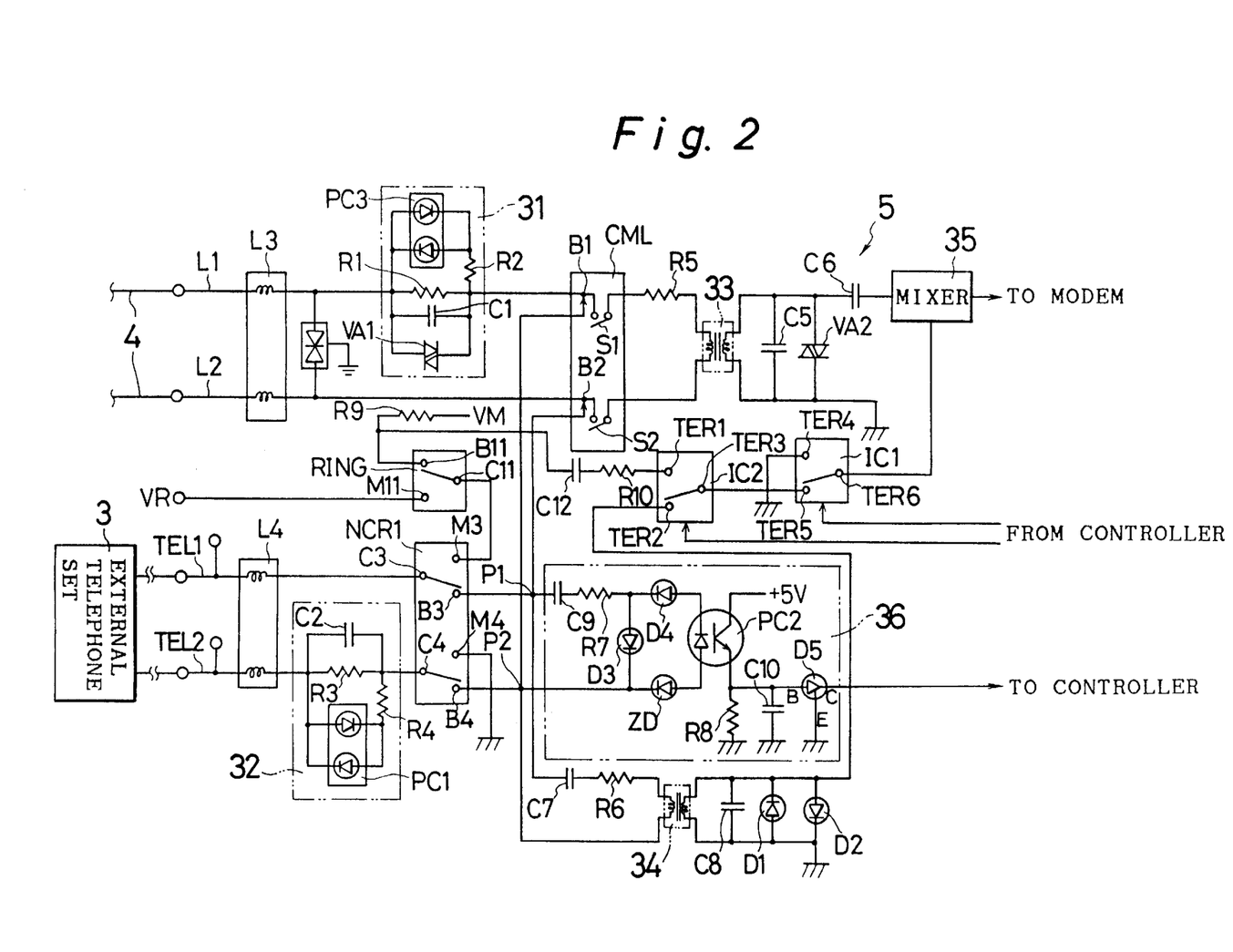
FIG. 2 is a circuit diagram showing the constitution of a network control circuit 5 shown in FIG. 1.

FIG. 2 is a circuit diagram showing the constitution of the network control circuit 5. Lines L1, L2 connected to the public telephone network 4 are connected to contacts B1, B2 of relay CML through a coil L3. An incoming detecting circuit 31 is connected on line L1. The incoming detecting circuit 31 comprises a photo coupler PC3 which is illuminated when a DC current flows in the line L1, resistors R1, R2, capacitor C1, and varistor VA1.

The relay CML is connected with contacts B3, B4 of relay NCR1 through connection points P1, P2.

At common contacts C3, C4 of the relay NCR1, lines TEL1, TEL2 connected to the external telephone set 3 through coil L4 are connected. An incoming detecting circuit 32 is connected on the line TEL2. The incoming detecting circuit 32 comprises a photo coupler PC1 which is illuminated when a DC current flows in the line TEL2, resistors R3, R4, and a capacitor C2.

A transformer 33 for detecting the facsimile control signal is connected to switches S1, S2 of the relay CML through resistor R5, and the detected facsimile control signal is given to the modem 8 through a mixer 35. Between the transformer 33 and mixer 35, capacitors C5, C6 and varistor VA2 are connected.

Likewise, at connection points P1, P2, a transformer 34 for detecting the facsimile control signal is connected through capacitor C7 and resistor R6, and the detected facsimile control signal is given to the modem through relays IC2, IC1 and mixer 35. Between the transformer 34 and relay IC2, capacitor C8 and diodes D1, D2 are connected. The relays IC1, IC2 are changed over by a changeover signal from the controller 7.

At connection points P1, P2, a number detecting circuit 36 for detecting the dial pulse and tone signal is connected, and the signal expressing the detected number is given to the controller 7. The number detecting circuit 36 comprises capacitors C9, C10, resistors R7, R8, diodes D3, D4, D5, Zener diode ZD, and photo coupler PC2, and +5 V is supplied to the photo transistor of the photo coupler PC2.

At contact M3 of the relay NCR1, a common contact C11 of the relay RING is connected. At changeover contact B11 of the relay RING, a voltage VM is applied from the power source circuit 28 through resistor R9, while changeover contact TER1 of the relay IC2 is connected through capacitor C12 and resistor R10. Thus, according to the procedure described below, the voice signal sent out from the controller 7 is given to the relay RING through the modem 8, mixer 35, and relays IC1, IC2. Therefore, by connecting the common contact C11 and changeover contact B11 at the relay RING, and connecting the common contacts C3, C4 and the changeover contacts M3, M4 at the relay NCR1, the voice signal given from the controller 7 is given to the external telephone set 3 through the line TEL1, while the voice signal given from the speaker of the handset is delivered at external telephone set 3.

Figure 3A:
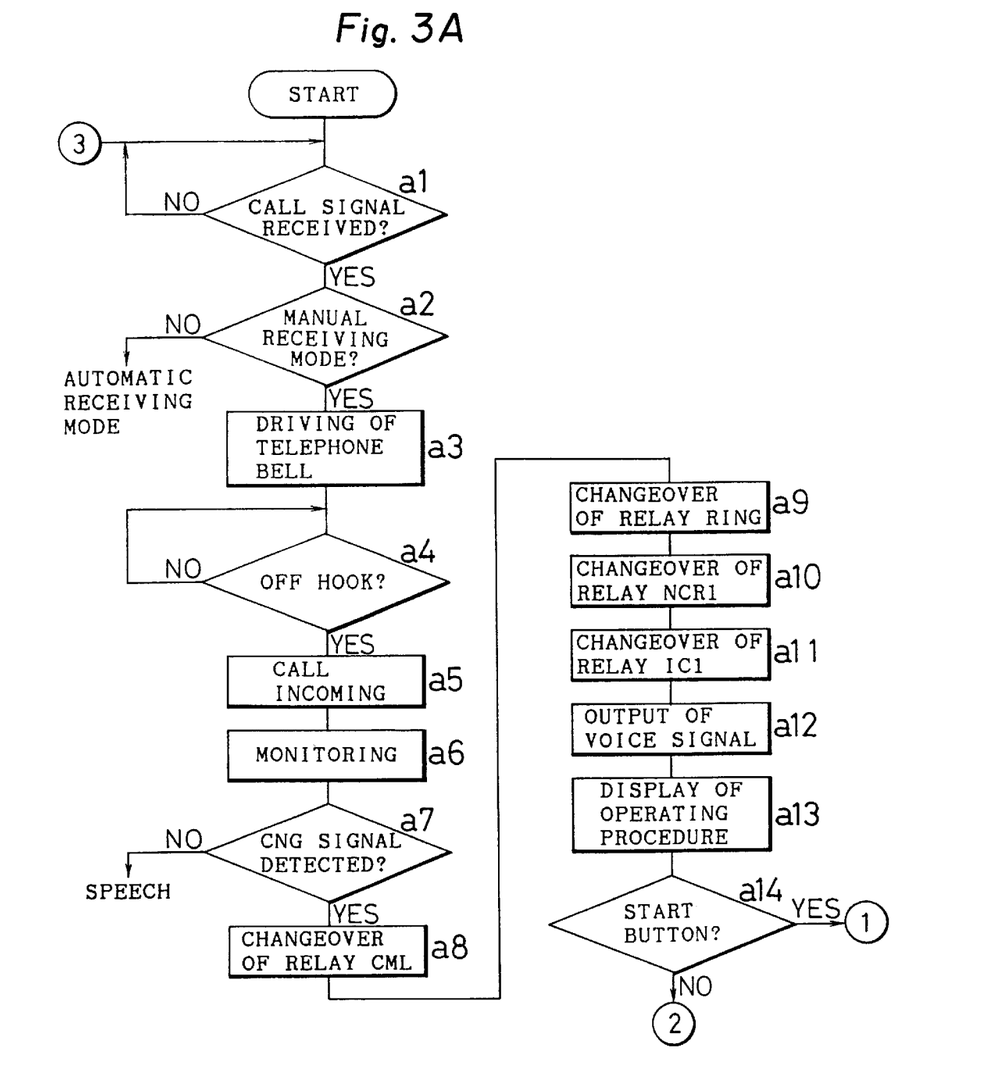
Figure 3B:
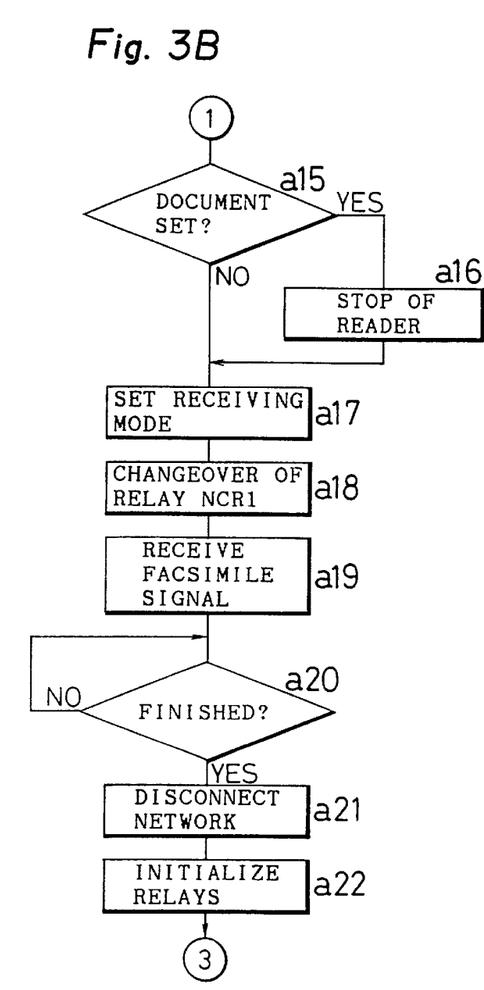
Figure 3C:
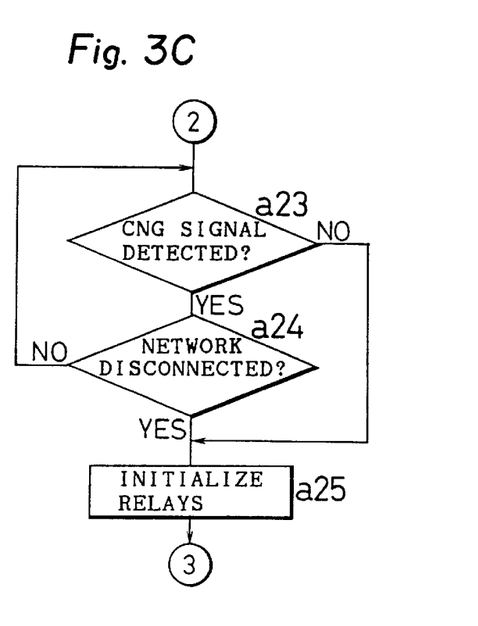
Figures 4A, 4B, 4C:
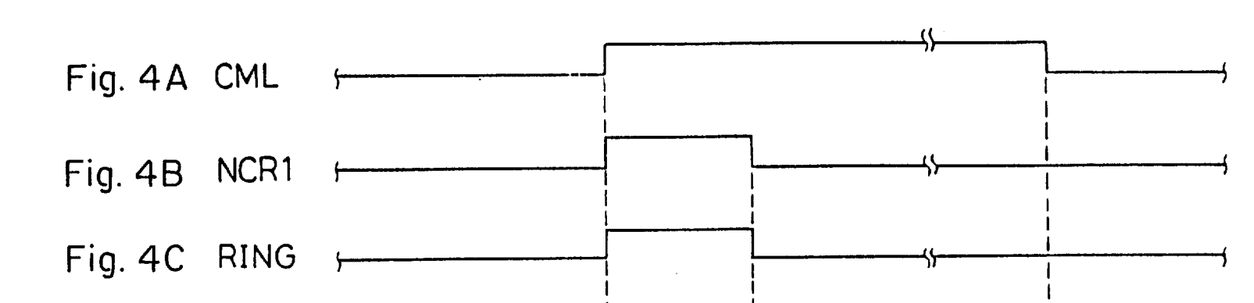
Figures 4D, 4E:
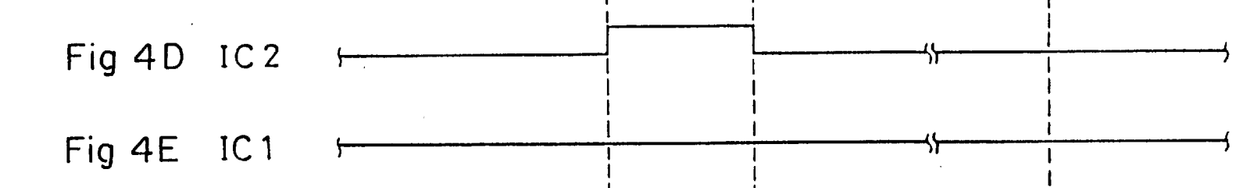
Figures 4F, 4G, 4H:
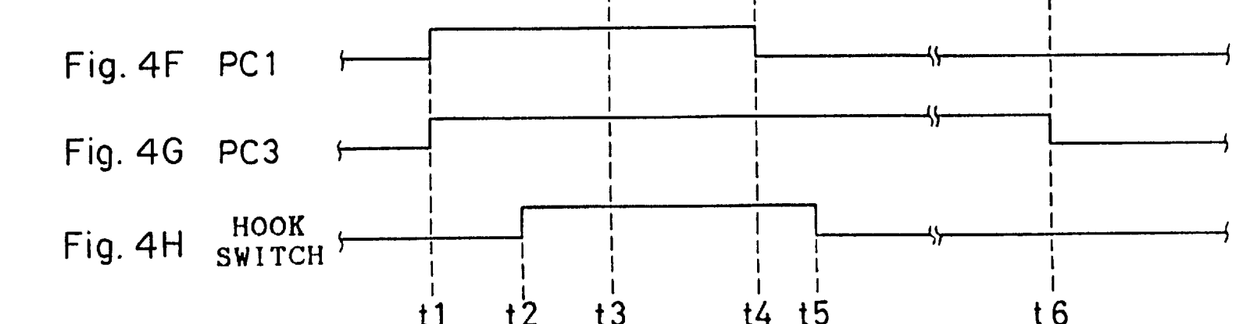

FIG. 3 is a flow chart for explaining the operation of the facsimile apparatus 1, and FIG. 4 is a timing chart for explaining the operation of the facsimile apparatus 1.

When a ringing signal is received at step a1 (time t1), it is judged at step a2 whether the facsimile apparatus 1 is set in manual receiving mode or in automatic receiving mode. If set in the automatic receiving mode, by closing the relay CML, the telephone network is closed by direct current at the transformer 33 side to accept, and thereafter the facsimile control signal or the like given through the public telephone network 4 is applied to the modem 8.

If set in the manual receiving mode, advancing to step a3, the bell of the external telephone set 3 is driven to issue a ringing bell. In response to this ringing bell sound, the operator of the facsimile apparatus 1 lifts the handset of the external telephone set 3, and it is judged whether it is in off-hook state or not at step a4. When the off-hook state is detected (time t2), incoming is processed at step a5. That is, through the external telephone set 3, the public telephone network 4 is closed by direct current, and by detecting the emission of the photo coupler PC3 of the incoming detecting circuit 32, the controller 7 recognizes that the incoming processing is over.

Consequently, at step a6, the facsimile control signal given through the transformer 34 is monitored. At this time, the common contact TER3 and changeover contact TER2 are connected at the relay IC2, and the changeover contact TER5 and common contact TER6 are connected at the relay IC1, and the facsimile control signal detected by the transformer 34, that is, the CNG signal is given to the modem 8 through the relays IC2, IC1, and mixer 35. The controller 7 monitors whether the CNG signal has been received or not according to the signal given from the modem 8.

When the CNG signal is detected at step a7 (time t3), the operation advances to step a8. At this time, if the CNG signal is not detected, since the calling side terminal device is a telephone set, the speech mode is set by the external telephone set 3.

At step a8, to receive facsimile signals, the relay CML is closed, and the transformer 33 and public telephone network 4 are connected, and the DC (direct current) closure is continued by the DC resistance component of the transformer 33. At step a9, according to the changeover signal from the controller 7, the common contact C11 and changeover contact B11 of relay RING are connected, and at step a10, successively, the common contacts C3, C4 and changeover contacts M3, M4 of the relay NCR1 are connected. Consequently, the voltage VM from the power source circuit 28 is supplied to the external telephone set 3. Therefore, the external telephone set 3 operates normally by this voltage VM.

At step a11, the relay IC2 is changed over. That is, the common contact TER3 and changeover contact TER1 are connected. As a result, the controller 7 and external telephone set 3 are connected through the modem 8, mixer 35, and relays IC1, IC2, RING, NCR1.

At step a12, the controller 7 produces a voice signal. This voice signal tells the operator of the facsimile apparatus 1 of the operating procedure for urging to receive the facsimile, and for example, a message "Please press the start button" is produced. The operator of the facsimile apparatus 1 can hear this message through the speaker of the handset of the external telephone set 3, and can know the operating procedure to be done by the operator.

At step a13, if the main body 2 has a display unit, a character message similar to the voice message, "Press start button", is displayed in the display unit as the operating procedure.

At step a14, it is judged whether the start button 15 of the operation panel 12 has been pressed or not. When the start button is pressed (time t4), advancing to step a15, the controller 7 judges whether the document is set in the reader 13 or not according to the output of the document sensor 17. When the document is set, the operation of the reader is suspended at step a16. That is, unless the operation is suspended, by pressing the start button 15, reading action of the document 15 set in the reader 13 is started, and the reception signal and transmission signal are confused, and normal facsimile communication is disabled.

Afterwards, at step a17, the reception mode of the facsimile signal is set.

At step a18, the relay NCR1 is changed over, and the supply of DC power VM to the external telephone set 3 is stopped (time +5).

At step a19, the facsimile signals to be received, that is, the facsimile control signal and image signal are received. At step a20, when facsimile communication is over (time t6), at step 21, it is judged whether the network is cut off or not by monitoring the photo coupler PC1 of the incoming detecting circuit 31. At step a22, to be ready for next incoming from the calling side terminal device, each relay is set in the initial state of the manual reception mode. Afterwards, returning to step a1, reception of ringing signal is awaited.

At step a14, if the start button 15 is not pressed, the operation advances to step a23 to monitor the CNG signal. That is, if the facsimile apparatus 1 which is the receiving side terminal device does not send out a response signal to the CNG signal, after a certain time lapse, the calling side terminal device stops sending CNG signal, and cuts off the network by force. Therefore, if the CNG signal is not detected at step a23, advancing to step a25 to be ready for next incoming, each relay is set in initial state.

Meanwhile, at step a23, if the CNG signal is detected, when the operator of the facsimile apparatus 1 puts on the handset of the external telephone set 3 at step a24, it is set in on-hook state, and disconnection of the network is detected to advance to step a25. Whether the network is cut off or not at step a24 is judged by monitoring the light emission of the photo coupler PC1 of the incoming detecting circuit 32. Afterwards, returning to step a1, reception of next ringing signal is awaited.

Thus, according to the embodiment, when the so-called manual receiving mode is set in the facsimile apparatus 1, by lifting the handset 3H of the external telephone set 3 in response to the ringing from the calling side terminal device, if the calling side terminal device is a facsimile apparatus set in automatic transmission mode, the operating procedure for setting the receiving mode of the facsimile signal is delivered to the external telephone set 3 instead of applying the CNG signal sent out from the calling side facsimile apparatus directly into the external telephone set 3.

Therefore, the operator of the facsimile apparatus 1, when lifting the handset 3H of the external telephone set 3, hears the voice signal produced from the speaker of the handset 3H, and knows that the incoming calling side terminal device is a facsimile apparatus, and learns the subsequent operating procedure easily.

Accordingly, if the operator is not familiar with the manipulation of the facsimile apparatus 1, the facsimile signal can be received securely, and occurrence of unsuccessful facsimile transmission may be prevented, while the certainty of information transmission may be notably enhanced.

In this embodiment, the facsimile apparatus 1 refers to the type not incorporating a telephone set within but to be connected with any purchased telephone set, but it may be similarly realized in a type of facsimile apparatus incorporating a telephone set, or in a type incorporating a telephone set and also capable of being connected with an external telephone set.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A facsimile apparatus comprising:

facsimile communication means for transmitting and receiving facsimile signals containing image signals;

a telephone including a speaker and a microphone, connected to a public telephone network, for transmitting and receiving sound signals;

first changeover means, interspaced between said public telephone network and said facsimile communication means, for connecting and disconnecting said public telephone network and said facsimile communication means;

a detector, connected to said public telephone network, for detecting a received facsimile control signal;

operating means for instructing start of reception of facsimile signals;

a memory for storing voice instruction data;

voice signal output means for producing a voice signal descriptive of operating procedures for receiving the facsimile signals in response to receipt of the voice instruction data from said memory;

second changeover means, interspaced between said public telephone network and said telephone, for connecting said telephone to either said public telephone network or said voice signal output means; and control means for starting the reception operation of the facsimile signals in response to receipt of an output from said operating means, in a manual reception mode for receiving the facsimile signals, by changing over said first changeover means after connection by said telephone, by changing over said first changeover means in response to an output of said detector after connection by lifting a handset of said telephone to connect said public telephone network and said facsimile communication means, and changing over said second changeover means to connect said telephone and said voice signal output means.

2. The facsimile apparatus according to claim 1, wherein the facsimile control signal is a CNG signal.

3. The facsimile apparatus of claim 1, wherein the telephone includes a handset having the speaker and the microphone.

4. A facsimile apparatus, connected to a communications network, comprising:

an image signal transceiver for receiving and transmitting image signals;

a telephone, including at least one speaker and at least one microphone, normally connected to the communications network;

a detector for detecting a received facsimile start signal;

a memory for storing voice operating instructions descriptive of operating procedures for receiving image signals; and a first switch, responsive to said detector, for connecting said telephone to said memory in order to output the voice operating instructions via at least one of said at least one speaker when said detector detects the received facsimile start signal.

5. The facsimile apparatus of claim 4, further comprising a second switch for connecting and disconnecting said image signal transceiver and said telephone from the communications network.

6. The facsimile apparatus of claim 4, wherein said memory is a ROM.

7. The facsimile apparatus of claim 4, wherein said telephone includes a handset, and wherein said at least one speaker and said at least one microphone are incorporated into said handset.

8. The facsimile apparatus of claim 4, wherein said detector detects a CNG signal as the facsimile start signal.

9. The facsimile apparatus of claim 4, further comprising:
- a mode switch for switching a mode of the facsimile apparatus to either an automatic mode or a manual mode; and
- means for automatically connecting said image signal transceiver to said communications network in response to any incoming call.

10. A facsimile apparatus, connected to a communications network, comprising:
- image signal transceiver means for receiving and transmitting image signals;
- a telephone including a microphone and a speaker;
- detector means for detecting a received facsimile start signal;
- memory means for storing voice operating instructions descriptive of operating procedures for receiving image signals; and
- switching network means for connecting said telephone to the communications network upon receipt of a call, connecting the telephone to receive the voice operating instructions from said memory means upon detection of the received facsimile start signal by said detector means, and connecting said image signal transceiver means to the communications network upon detection of the received facsimile start signal by said detector means.

11. The facsimile apparatus of claim 10, further comprising:
- control means, responsive to said detector means, for converting the voice operating instructions stored in said memory means into analog voice electrical signals and for sending the analog voice electrical signals to the speaker included in said telephone.

12. The facsimile apparatus of claim 10, wherein said memory means is a ROM.

13. The facsimile apparatus of claim 10, wherein said telephone includes a handset, and wherein the speaker and the microphone are incorporated into said handset.

14. The fasimile apparatus of claim 10, wherein said detector means detects a CNG signal as the fasimile start signal.

15. A method for receiving image signals in a facsimile apparatus, the facsimile apparatus including an image transceiver and a telephone, the method comprising the steps of:
- (a) receiving a call from a communications network;
- (b) determining whether the received call comprises a facsimile start signal;
- (c) connecting the received call to the telephone if it is determined in said step (b) that the received call does not comprise a facsimile start signal; and
- (d) connecting the telephone to a voice signal generated within the facsimile apparatus if it is determined in said step (b) that the received call comprises the facsimile start signal in order to deliver to a receiver of the call instructions describing operating procedures for receiving image signals via the facsimile apparatus.

16. The method of claim 15, wherein said step (b) comprises determining whether the call comprises a CNG signal.

17. A facsimile apparatus, connectable to a communications network, comprising:
- an image signal transceiver, receiving and transmitting image signals;
- a telephone including at least one speaker and at least one microphone, normally connected to the communications network;
- a detector, detecting a received facsimile start signal;
- a memory, storing operating instruction data descriptive of operating procedures for receiving image signals; and
- a controller, connected to said memory, retrieving said instruction data from said memory in response to said detector detecting a received facsimile start signal, to communicate the instruction data as voice signals to a user of the facsimile apparatus via said telephone.

18. The facsimile apparatus of claim 17, wherein said controller communicates the instruction data to the user of the facsimile apparatus by transmitting the voice signals to said at least one speaker.

19. The facsimile apparatus of claim 17, further comprising a display, wherein said controller communicates the instruction data as displayed images via said display to the user of the facsimile apparatus by transmitting the instruction data to said display.

20. The facsimile apparatus according to claim 1, wherein said memory also stores display operating instructions, the facsimile apparatus further comprising:
- display means for displaying the display operating instructions upon reception of the facsimile signals.

21. The facsimile apparatus of claim 4, wherein said memory also stores display operating instructions, the facsimile apparatus further comprising:
- a display for displaying the display operating instructions when said detector detects the received facsimile start signal.

22. The facsimile apparatus of claim 10, wherein said memory means also stores display operating instructions, the facsimile apparatus further comprising:
- display means for displaying the display operating instructions when said detector means detects the received facsimile start signal.

23. The method of claim 15, further comprising:
- (e) displaying to the receiver the instructions describing operation of the facsimile apparatus when it is determined in said step (b) that the received call comprises the facsimile start signal.

24. A facsimile apparatus, connectable to a communications network, comprising:
- an image signal transceiver, receiving and transmitting image signals;
- a telephone including at least one speaker and at least one microphone, normally connected to the communications network;

a detector, detecting a received facsimile start signal;

a memory, storing operating instruction data descriptive of operating procedures for receiving image signals;

a display, displaying images; and a controller, connected to said memory, retrieving said instruction data from said memory in response to said detector detecting a received facsimile start signal, to communicate the instruction data as images to a user of the facsimile apparatus via said display.

25. The facsimile apparatus of claim 24, wherein said controller further communicates the instruction data as voice signals via said telephone to the user of the facsimile apparatus by transmitting the instruction data to said telephone.

* * * * *